United States Patent

[11] 3,565,138

[72] Inventor Alva Z. Albright
 Port Barre, La. ((P.O. Box 762 Woodstock, Ontario, Canada))
[21] Appl. No. 766,032
[22] Filed Oct. 3, 1968
[45] Patented Feb. 23, 1971

[54] APPARATUS AND METHOD FOR FELLING TREES
 2 Claims, 5 Drawing Figs.
[52] U.S. Cl. ................................................ 143/32, 144/34
[51] Int. Cl. ................................................ B27b 17/08; A01g 23/08
[50] Field of Search ........................................ 143/32, 32.10, 32—34; 144/34, 3—4, 309.34

[56] References Cited
UNITED STATES PATENTS
2,876,816  3/1959  Busch et al. ................. 144/34(.5)
3,140,736  7/1964  Propst ......................... 144/3(.4)
3,364,964  1/1968  Lacey .......................... 144/34

FOREIGN PATENTS
142,106  3/1961  U.S.S.R. ....................... 143/32(.34)

*Primary Examiner*—Donald R. Schran
*Attorney*—James B. Lake, Jr.

ABSTRACT: A chain saw mounted on and running around a transversely wedge-shaped cutter bar, in cutting and noncutting said cutter bar being directly hinged to a second hollow bar or anvil, and operable by a hydraulic cylinder mounted therein and operably attached therebetween to open and close in cooperation with the cutter bar and chain saw as a pair of scissors, said hollow anvil bar being opposed to the narrow edge of the transversely wedged cutter bar, and receiving therein said narrow edge and the cutting run of the chain saw, the noncutting run being recessed into the broad edge of said cutter bar.

PATENTED FEB 23 1971 3,565,138

INVENTOR.
ALVA Z. ALBRIGHT
BY Lake & Pugh
ATTORNEYS

APPARATUS AND METHOD FOR FELLING TREES

The invention relates generally to saws and more particularly to a chain saw with transversely wedge-shaped cutter bar and arranged with an additional element hinged therewith in scissors conformation.

It is an object of the invention to provide an apparatus and method for more rapidly felling trees up to about a 36" diameter and to accurately fell them in a predetermined direction.

Another object of the invention is to provide an apparatus for protecting the chain saw from damage by the falling tree.

Another object of the invention is to provide an apparatus and method for using the tree to be felled for orienting the apparatus therewith to prevent binding of the saw in the cut.

Another object of the invention is to provide a guard for all but the cutting run of the saw chain.

Other objects and an understanding of the invention can be had by referring to the following description and claims and the drawings in which:

Figure 1:
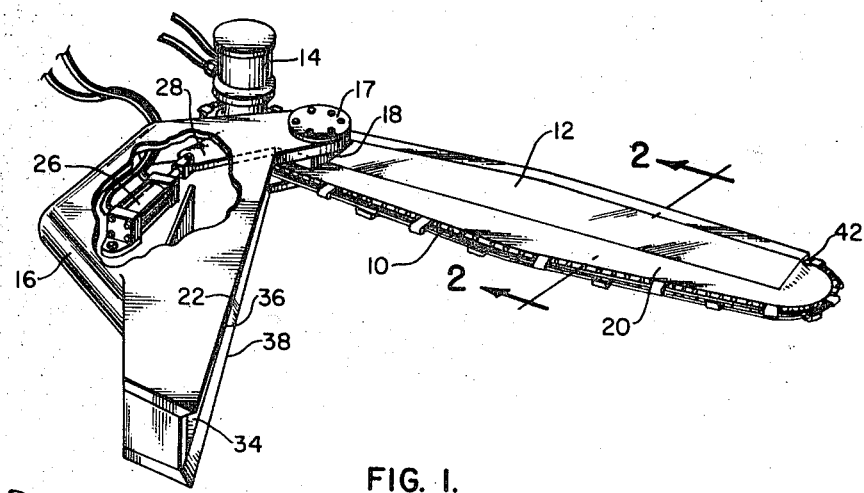
FIG. 1 is a perspective of the invention with scissor parts open.
Figure 3:
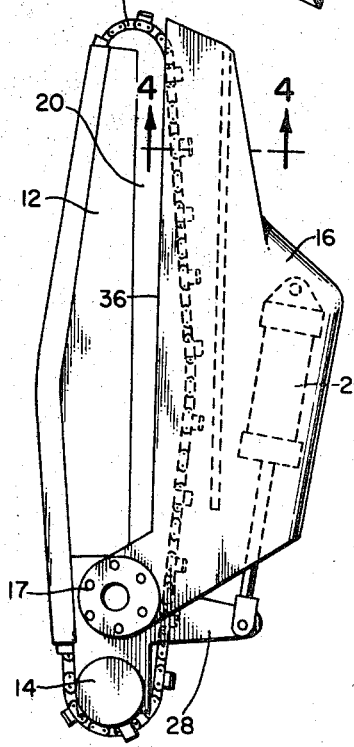
FIG. 3 is a plan view of the invention with the scissor parts closed.
Figure 2:
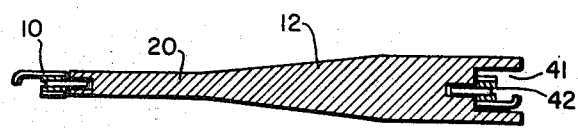
FIG. 2 is a cross section of the cutter bar along section line 2-2 of FIG. 1 showing the wedge shape.
Figure 4:
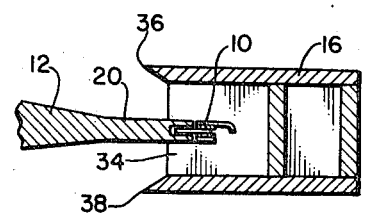
FIG. 4 is a partial cross section of the scissors bar along section lines 4-4 of FIG. 3.
Figure 5:
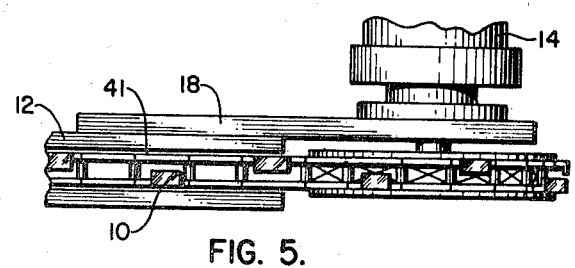
FIG. 5 is a partial elevational view of driving means for the chain saw.

Referring to FIG. 1, the invention comprises a chain saw 10 of standard design arranged to rotate around a transversely tapered wedge-shaped cutter bar 12, driven by an standard type of driving means, preferably an hydraulic motor and chain sprocket. A second bar or anvil 16 is pivoted with a trunnion 17 to the base 18 of the wedged center bar 12 so that the narrow edge 20 of the wedged cutter bar 12 is opposite the inner edge 22 of the second bar or anvil 16. The arrangement is similar to that of the blades of a pair of scissors with the opening and closing of the bars 12 and 16 controlled by a hydraulic cylinder 26 mounted on the second bar 16 and operatively connected to a projecting flange 28 of the cutter bar 12. In use the two bars open around the pivot trunnion 17. A tree to be cut is engaged between the two bars as they are closed around it by actuating the hydraulic cylinder 26. The movement of the chain saw 10 around the cutter bar 12 cuts into the tree and the force of the hydraulic cylinder 26 closing the bars forces the wedged cutter bar 12 into the cut made by the chain saw and tips the tree in the direction of the wedge and fall when the cutting has been completed.

The action of the anvil 16 in engaging a tree trunk keeps the chain saw 10 and cutter blade 12 in the same relative position to the tree and thus facilitates the cutting by preventing it from binding in the cut. The anvil 16 is double edged on the tree engaging side with a hollow 34 defined between said edges to receive the cutting run 35 of the chain saw 10 and the engaging portion of the wedged cutter bar 12. Of the double edges, the highest edge 36 acts as a pivot support for the falling tree and a protecting cover for the chain saw and the lower edge 38 digs into what will be the stump of the felled tree to provide support and orientation for the apparatus.

A safety feature is provided by a deep channel 41 defined in the thick edge of the tapered bar 12 which receives the back run 42 of the chain saw 10 so that it is completely hidden and unengageable in the channel.

The apparatus is used mounted on a small tractor or other power train (not shown) that provides hydraulic takeoff. To operate, the apparatus mounted in its power train is wheeled up to a tree to be felled which is engaged between the pivoted-apart cutter and second bars. The chain saw is actuated by means of its hydraulic motor and drive and the hydraulic cylinder is activated to close the bars around the tree. As the chain saw in its cutting run cuts into the tree the hydraulic cylinder biases the cutter bar and anvil to close thereby forcing the transversely wedged cutter bar into the deepening saw cut and tipping the tree more and more in the direction of the cutting which should be the desired direction of fall. Also the closing action binds the apparatus to the tree in an unvariable cutting plane to prevent all binding of the cutter bar and saw chain in the cut. Usually the last bit of the tree breaks off before being cut. As the tree falls the cutting run of the saw chain and the narrow edge of the cutter bar is received into the channel defined in the anvil and is protected from being damaged by the falling tree. The apparatus is then backed away from the felled tree, the tow bars opened and the apparatus advanced in the direction of desired fall to the next tree to be felled.

Although the invention has been described with a certain degree of particularity it should be understood it is only by way of example and that changes can be made in the arrangement and composition of parts without departing from the spirit and scope of the invention as hereinafter claimed.

I claim:

1. An improved tree cutting apparatus comprising in combination: a chain saw having a cutter bar with a projecting flange adjacent one end there of, and a saw chain peripherally mounted for rotation around said cutter bar in cutting and noncutting runs, the edge of said cutter bar adjacent said noncutting run defining a recess for receiving said latter run therein for preventing a cut and falling tree from stripping the saw chain off the cutter bar and also to prevent said latter run from engaging adjacent objects; a hollow anvil directly pivoted by an end to said cutter bar adjacent its flanged end for scissors action therewith, said hollow anvil having parallel inner edges opposing the cutter bar and an oppositely disposed closed back, said inner edges receiving the cutting run and adjacent edge of the cutter bar for shielding them from a cut and falling tree; driving means mounted on said cutter bar behind the pivot with the anvil to remove it from range of tree damage and for driving the saw chain; reciprocating power means pivotally mounted in said hollow anvil for protection from a cut and falling tree, and pivotally connected with said projecting flange to pivot the chain saw and the anvil in scissors action for engaging and cutting a tree therebetween, whereby both runs of saw chain, the reciprocating power means and the driving means are prevented from becoming casualties of their operating results.

2. An improved tree cutting apparatus as described in claim 1 wherein the parallel inner edges of said hollow anvil opposing the cutting run of said saw chain are sharpened to bite into a tree engaged for cutting to prevent any movement of the apparatus up the tapered tree trunk to thereby bind the chain saw in its cut.